US005153406A

United States Patent [19]

Smith

[11] Patent Number: 5,153,406

[45] Date of Patent: Oct. 6, 1992

[54] MICROWAVE SOURCE

[75] Inventor: Donald K. Smith, Arlington, Mass.

[73] Assignee: Applied Science and Technology, Inc., Woburn, Mass.

[21] Appl. No.: 359,160

[22] Filed: May 31, 1989

[51] Int. Cl.[5] .................... B23K 9/00

[52] U.S. Cl. .................... 219/121.43; 219/121.42; 219/10.55 R; 219/10.55 A

[58] Field of Search .................... 219/10.55 R, 10.55 A, 219/10.55 B, 10.55 F, 121.43, 121.4, 121.48, 121.42

[56] References Cited

U.S. PATENT DOCUMENTS 3,611,582 10/1971 Hamid et al. .................... 219/10.55 A
3,715,555 2/1973 Johnson .................... 219/10.55 A
4,128,751 12/1978 Sale .................... 219/10.55 A
5,003,152 3/1991 Matsuo et al. .................... 219/121.43
5,032,202 7/1991 Tsai et al. .................... 219/121.43

*Primary Examiner*—Mark H. Paschall
*Attorney, Agent, or Firm*—Iandiorio & Dingman

[57] ABSTRACT

A microwave coupling device for generating a microwave field in a circular waveguide for energizing a material including a rectangular input waveguide for carrying microwave energy from a microwave source, a circular output waveguide, and a device for coupling the microwave energy from the input waveguide to the output waveguide for generating in the output waveguide the microwave field. Further included is structure for permitting external monitoring through the output waveguide of the material being energized.

29 Claims, 4 Drawing Sheets

Fig. 2A
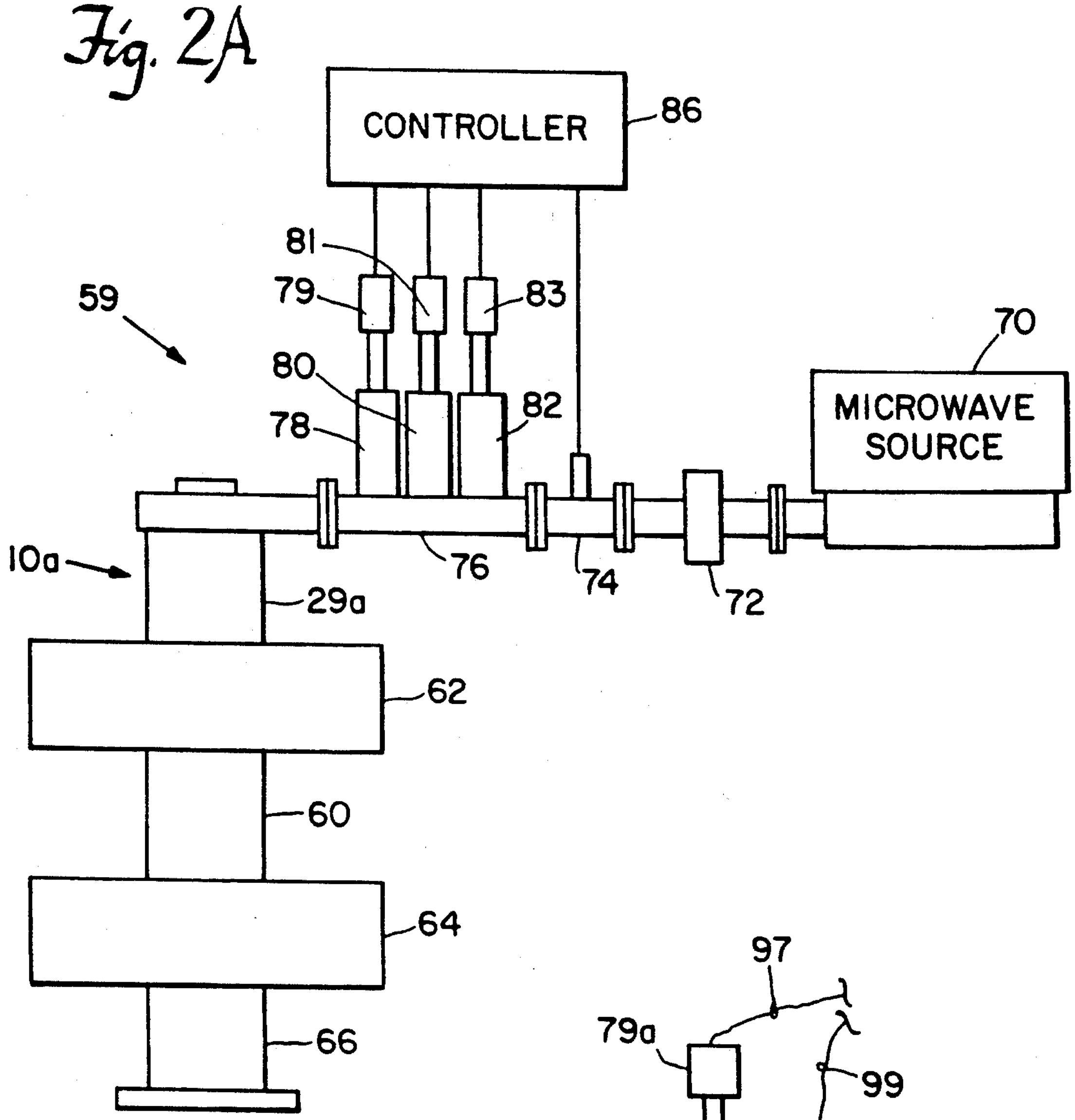
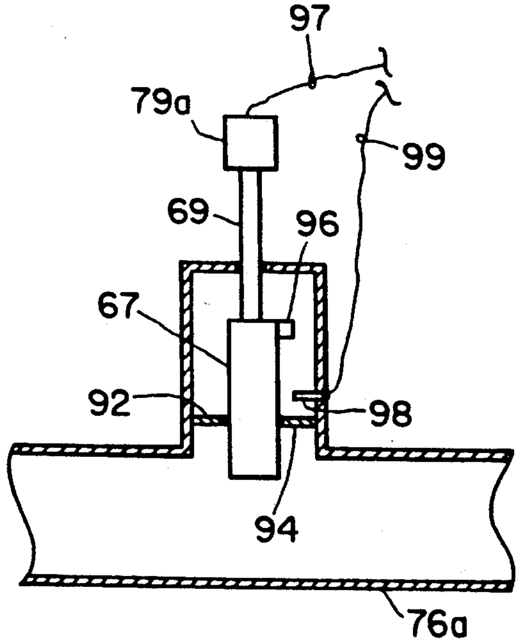
Fig. 2B

MICROWAVE SOURCE

FIELD OF INVENTION

This invention relates to a microwave source and more particularly an axisymmetric microwave source which may be impedance tuned to efficiently and symmetrically couple microwave energy to a material being energized.

BACKGROUND OF INVENTION

Microwave sources are used for a variety of applications in which it is necessary to energize a material, for example in the formation of plasmas or ions for semiconductor processing, and as a heat source, for example in sintering ovens. However, the microwave sources typically employ a simple rectangular waveguide to deliver the microwave energy to the material processing region. Although that form of delivery may at times be relatively efficient, it does not uniformly energize the material, which is important when material processing uniformity is desirable. In addition, those microwave sources are typically not tunable to a wide range of load impedances, which may result in the inefficient use of the microwave energy.

For use with electron cyclotron resonance (ECR) plasma sources, the narrow impedance tuning range is a greater drawback. ECR sources typically have a much broader impedance range; the microwave sources currently available cannot be tuned to allow use under different ECR conditions. As a result, a number of interchangeable microwave sources must typically be used with ECR plasma sources, each of which is tunable to a small range of the ECR conditions.

Even in applications in which the load impedance can be closely matched, for example a plasma source with limited variation in gas composition, flow rate and pressure, the non-uniformity of the microwave field in the microwave sources results in very uneven materials processing. The non-uniform fields produce an equally non-uniform plasma, or non-uniform material heating, which causes variations in the materials processing parameters. In many applications, for example semiconductor substrate processing, those variations can greatly affect the product quality and yield.

SUMMARY OF INVENTION

It is therefore an object of this invention to provide a microwave source that can be used to efficiently energize virtually any material.

It is a further object of this invention to provide a microwave source that can be tuned to match a wide range of impedances.

It is a further object of this invention to provide a microwave source which can be used with an ECR plasma generator.

It is a further object of this invention to provide a microwave source which can be used with an unmagnetized plasma source.

It is a further object of this invention to provide a microwave source which can automatically be tuned to match the load impedance.

This invention results from the realization that microwave sources for material energization can be greatly improved by employing a fixed microwave field generating probe in a circular output waveguide and tuning with a multistub tuner to provide impedance matching to a wide range of loads so that the source can be used with an ECR or non-ECR plasma generator, or a materials processing system. This invention results from the further realization that the microwave sources can be further improved by using an open tubular microwave field generating probe to allow external monitoring through the probe of the material being energized.

This invention features a microwave coupling device for generating a microwave field in a circular waveguide for energizing a material. The device includes a rectangular input waveguide for carrying microwave energy from a microwave source, a circular output waveguide, and means for coupling the microwave energy from the input waveguide to the output waveguide for generating in the output waveguide the microwave field. Further included are means for permitting external monitoring through the output waveguide of the material being energized. The means for coupling preferably includes a probe passing through the input waveguide and into the output waveguide. The probe may be coaxial with the output waveguide for producing an axisymmetric microwave field. Preferably, the probe is cylindrical. The probe may be tubular and open at both ends to provide the means for permitting external monitoring through the probe interior.

The means for coupling the microwave energy from the input waveguide to the output waveguide may also include a solid plate transverse to the probe for separating the input waveguide from the output waveguide. In that case, there may further be included an enlarged opening in the plate coaxial with the probe for creating an open passage between the input waveguide and the output waveguide for supporting a radial electric field to launch the microwave field in the output waveguide. Preferably, that passage is annular for uniformly launching the microwave field to produce an axisymmetric field for axisymmetrically energizing the material. In one embodiment, the probe has a diameter of approximately one inch; in that case, the enlarged opening preferably has a diameter of approximately 1.5 inches for creating an annular passage approximately 0.25 inches wide. This arrangement provides generation of an axisymmetric circular microwave field from a 2.45 gigahertz microwave source.

The coupling device preferably also includes means, integral with the waveguide, for tuning the microwave field to substantially match the load impedance. This allows the device to be used with a number of loads; for example, ECR or unmagnetized plasma sources or solid materials such as ceramics.

The means for tuning is preferably a multi-stub tuner having a number of tuning stubs individually insertable into the input waveguide. In that case, for automatic operation there may further be included means for controlling the insertion of the stubs into the input waveguide. The means for controlling may include means for indicating the depth of insertion of the stubs in the input waveguide for repeatable operation and may alternatively include motor means for separately controlling the amount of stub insertion in the waveguide.

The device may further include means, integral with the input waveguide, for detecting the amount of reflected microwave power in that portion flowing toward the microwave source. In that case, the means for controlling the insertion of the stubs is preferably responsive to the means for detecting the reflected power for inserting the stubs in the waveguide to minimize the reflected power. In a preferred embodiment, the stub tuner includes at least three tuning stubs for matching the real and reactive load impedance.

This invention also features a microwave source for generating a circular axisymmetrical microwave field for axisymmetrically energizing material including a rectangular input waveguide, means for introducing a microwave source into the input waveguide, a circular output waveguide, and means for connecting the input waveguide to the output waveguide. A rod assembly passing through the input waveguide and coaxially into the output waveguide is included for generating in the output waveguide from the microwave source the circular axisymmetric microwave field. The microwave source also includes tuning means in the input waveguide for altering the microwave field to substantially match the load impedance for efficiently coupling the microwave energy to the material. Preferably, the tuning means includes a three stub tuner for substantially matching the real and reactive load impedance.

Also featured in this invention is a microwave plasma generator including a waveguide apparatus with a circular output waveguide, means for introducing a microwave source into the waveguide apparatus and means for generating from the source in the output waveguide a microwave field. Means are included in the waveguide apparatus for tuning the field to substantially match the load impedance. A vacuum chamber is included for containing a gas to be energized to form the plasma, along with means for introducing the gas into the vacuum chamber. Also included are means for coupling the field to the gas for energizing the gas to form the plasma. Preferably, the means for tuning includes a multistub tuner integral with the waveguide apparatus for substantially matching the real and reactive load impedance.

In a preferred embodiment, the waveguide apparatus includes a rectangular input waveguide coupled to a circular output waveguide. The means for generating may then include a tubular probe passing through the input waveguide and coaxially into the output waveguide. The probe may be open at both ends to allow external monitoring through the probe of the plasma. In that case, one end of the probe is preferably covered with an ultraviolet shield to prevent ultraviolet radiation from escaping from the waveguide apparatus through the probe. Preferably, the probe has a diameter of less than one-half of the wavelength of the microwave field to prevent the field from escaping from the waveguide apparatus through the probe. In a preferred embodiment, the probe is cylindrical. The probe may be inserted into the output waveguide a distance of approximately an integral multiple of one-quarter of the wavelength of the microwave field for at least partially matching the plasma impedance.

DISCLOSURE OF PREFERRED EMBODIMENT

Other objects, features and advantages will occur to those skilled in the art from the following description of a preferred embodiment and the accompanying drawings, in which:

FIG. 2A is a schematic view of a microwave plasma generator for producing an axisymmetric plasma according to this invention;

FIG. 2B is a simplified cross-sectional, schematic diagram of a tuning stub of the impedance tuning apparatus of the microwave plasma generator of FIG. 2A;

This invention may be accomplished in a microwave coupling device for generating a microwave field for energizing a material. The device includes a rectangular input waveguide, a circular output waveguide, means for coupling microwave energy from the input waveguide to the output waveguide for generating in the output waveguide a microwave field, and means for permitting external monitoring through the output waveguide of the material being energized. Preferably, a probe assembly, which may be a cylindrical, tubular assembly passing through the input waveguide and coaxially into the output waveguide, is employed for generating the microwave field. Preferably, the generated field is a circular axisymmetric field. Means for tuning the field to substantially match the load impedance are preferably included in the input waveguide. The tuner may be a three stub tuner with the stubs individually controllable for matching the impedance of a variety of loads, including magnetized (ECR) and unmagnetized plasmas, and other materials, for example ceramics in a sintering oven.

In a microwave plasma generator, the invention may be accomplished with a waveguide apparatus, means for introducing a microwave source in the waveguide apparatus, and means for generating an axisymmetric microwave field from the source. The plasma generator further includes means in the waveguide apparatus for tuning the field to substantially match the load impedance, a vacuum chamber for containing the gas to be ionized to form the plasma, and means for introducing the gas into the vacuum chamber. Further included are means for coupling the field to the gas for energizing the gas to form the plasma.

Figure 1A:
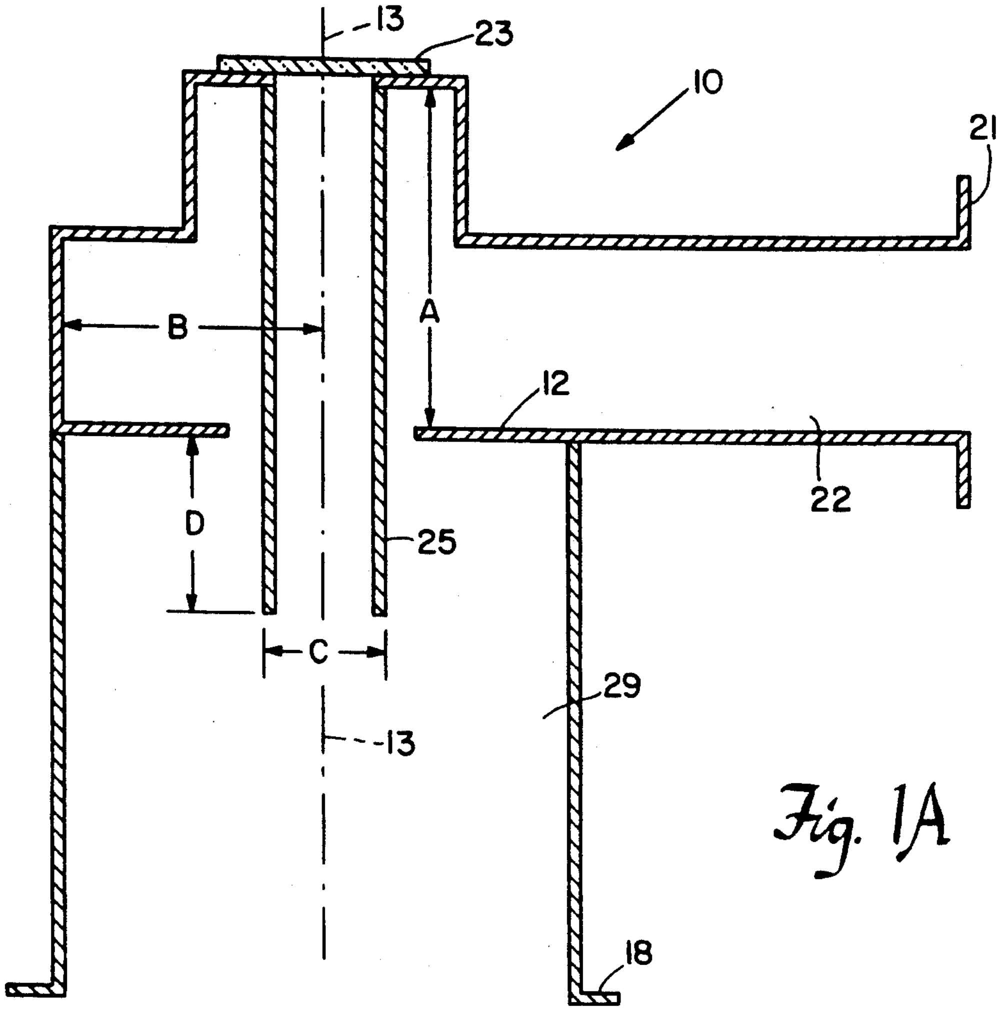
FIG. 1A is a cross-sectional, schematic view of a microwave coupling device according to this invention for generating a circular axisymmetric microwave field.

There is shown in FIG. 1A microwave coupling device 10 according to this invention for generating a microwave field in circular output waveguide 29. Rectangular input waveguide 22 is coupled to a microwave source, not shown, through flange 21. Probe 25 passes through input waveguide 22 and into output waveguide 29 for generating from the microwave source the microwave field. Flange 18 is provided for attachment to a downstream device, for example a vacuum chamber or ECR source for plasma production, or an oven for materials processing.

For generating a circular axisymmetric microwave field, probe 25 is coaxial along axis 13 with output waveguide 29. Probe 25 is shown in FIG. 1A as a cylindrical tubular probe, although this is not a limitation of the invention. For example, the probe could be solid, or not have a circular cross section. Probe 25 is separated from wall 12 dividing output waveguide 29 from input waveguide 22 by gap 11, which supports a radial electric field for launching the microwave field in output waveguide 29. Preferably, gap 11 is annular and concentric with axis 13 for launching an axisymmetric mode, for example a $TM_{01}$ mode.

For close impedance matching and efficient coupling of the microwave energy to the downstream material, dimensions A, B, C and D may be chosen for the specific application. The actual dimensions could be calculated by one skilled in the art. As an example, for a 2.45 gigahertz input, dimension C may be one inch. Preferably, if a tubular probe is employed, its diameter is less than one-half of the wavelength of the microwave field to prevent microwaves from escaping from the device through the probe. For a one inch cylindrical tube probe, annular space 11 is preferably approximately 0.25 inches for supporting the radial electric field. If gap 11 is too narrow, arcing may occur between probe 25 and wall 12. In addition, the close spacing would create a low impedance coaxial connection which would make the device difficult to tune. On the other hand, if gap 11 is too large, mixed modes will be created in output waveguide 29. With the spacing detailed above, a single $TM_{01}$ axisymmetric mode is launched in output waveguide 29 for axisymmetrically energizing a downstream material.

Dimensions A and B are preferably approximately one-half wavelength and one-quarter wavelength, respectively, for efficiently coupling the input power to output waveguide 29. Dimension D may be altered depending on the application of device 10, and is preferably approximately one-quarter wavelength for use with ECR sources and approximately three-quarters wavelength for use with unmagnetized plasma sources. However, with the capability of tuning over a wide range of impedances, as discussed below in conjunction with FIG. 2, probe insertion length D is not critical.

By using tubular probe 25 with both ends open, external monitoring of the material being energized is possible. Because probe 25 has a diameter of less than one-half of the microwave wavelength, microwaves cannot escape from coupling device 10. When coupling device 10 is used for energizing a gas for a plasma source, ultraviolet shield 23 may be employed to prevent ultraviolet radiation from the plasma from escaping through probe 25.

The direct path created through probe 25 to the material being processed allows many types of monitoring which previously were difficult to accomplish. For example, the plasma may be monitored visually or with instrumentation to determine its temperature or size, for example. The open tube also provides a path for external monitoring with radiation sources. As an example, an external laser source may be employed to monitor the plasma or the material being processed by reflection and analysis. This greatly simplifies the external monitoring and analysis, thereby allowing greater process control and making the instrumentation and analysis procedures less costly.

Figure 1B:
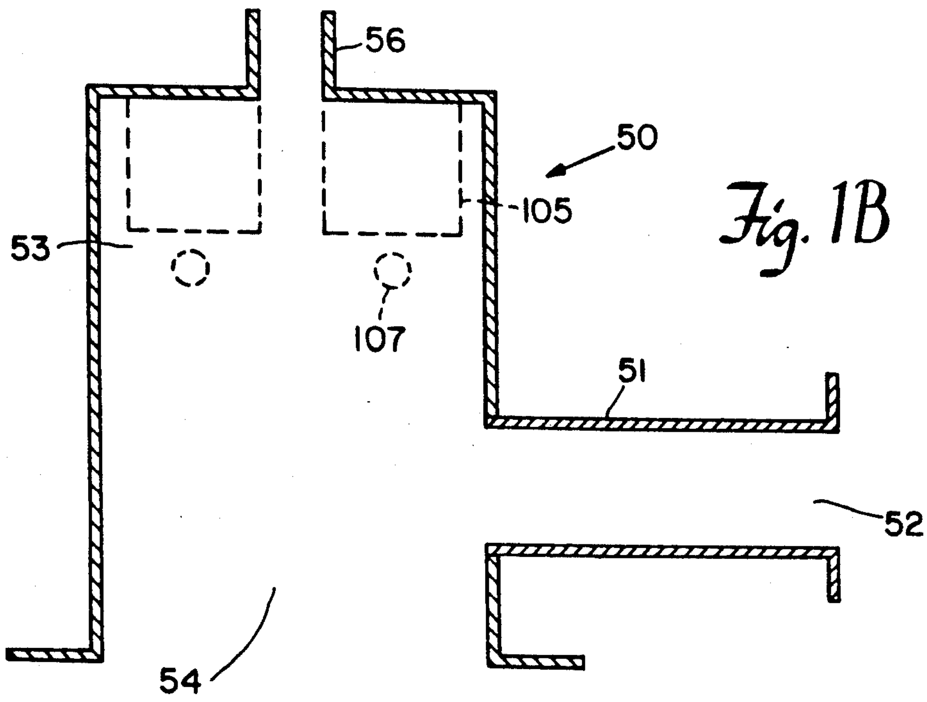
FIG. 1B is a cross-sectional, schematic view of an alternative microwave coupling device according to this invention for generating in a circular waveguide a microwave field and providing access for external monitoring of the material being energized.

An alternative coupling device 50 is shown in FIG. 1B. Rectangular input waveguide 51 having input 52 for a microwave source is coupled to circular output waveguide 53. The coupling of rectangular input waveguide 51 to circular output waveguide 53 creates a microwave field in waveguide 53 which exits through opening 54 for use in energizing a downstream material, not shown. Slug 105 or annular ring 107, shown in phantom, may be included in waveguide 53 for mode filtering; the size, shape and placement of the mode filter is a design choice which would be apparent to one skilled in the art. Tubular opening 56, which allows external monitoring through waveguide 53 of the material being energized, is less than one-half of a wavelength in diameter to prevent microwaves from escaping. The length of tube 56 is not critical for prevention of microwave leakage, but is preferably at least $\frac{1}{4}$ of a wavelength long to insure that no leaks occur.

An ECR plasma generator 59 according to this invention is shown in FIG. 2A. Other configurations will occur to one skilled in the art and are within the scope of the invention. For example, only one magnet may be used. Coupling device 10*a* with output waveguide 29*a* couples microwaves from microwave source 70 to ECR chamber 60 in which a feed gas is energized to form a plasma. Annular magnets 62 and 64 are provided for creating the ECR conditions and guiding the plasma through output section 66 for use downstream. The plasma may be used for any application in which a plasma is required; for example, in etching or photoresist stripping in integrated circuit processing, or as an ultraviolet source for use downstream, for example, for reactive gas generation for microcircuit fabrication. Although microwave plasma generator 59 is shown as an ECR source, this is not a limitation of the invention. The microwave coupling device of this invention may also be used with an unmagnetized plasma source, a cavity or an absorber.

Microwave coupling device 10*a* may be used to efficiently couple a microwave field from output waveguide 29*a* to any material to be energized. By including the ability to tune to a wide range of load impedances, coupling device 10*a* may be used without alteration to efficiently couple microwave energy to a material. The wide tuning range is provided by the means for coupling, for example the probe of FIG. 1A, along with the means for tuning.

An ECR plasma source will be used as a non-limiting example of an application in which coupling device 10*a* has great utility. Since the magnets established the conditions of electron cyclotron resonance, ECR has a wide range of impedances which need to be matched. Traditional unmagnetized plasma sources also have a wide range of impedances which vary in relation to gas composition, flow rate and pressure, for example.

The operation of microwave plasma generator 59 may best be described by beginning with microwave source 70, which may have an output of between 900 megahertz and 28 gigahertz, but is typically a 2.45 gigahertz source. Circulator 72 isolates source 70 so reflected power does not damage the source. Coupler 74 measures reflected power flowing back toward microwave source 70 for use in tuning to match the system impedance. Coupler 74 may also be used to measure the phase of the reflected power and/or the forward power. Controller 86 is responsive to coupler 74 for individually adjusting the stubs in three stub tuner 76 to minimize reflected power and closely match the system impedance.

Three stub tuner 76 includes stubs 78, 80 and 82 which are individually controlled by insertion devices 79, 81 and 83, respectively, which may be stepping motors. Stubs 78, 80 and 82 may also be manually controlled; in that case, a reflected power meter is preferably used with coupler 74 for indicating the reflected power to allow manual tuning. With the microwave coupling device 10*a* according to this invention and three stub tuner 76, the 2.45 gigahertz source may be tuned to loads having VSWR (Voltage Standing Wave Ratio) in the range of approximately 1 to 10.

An individual stub of three stub tuner 76*a* is shown in FIG. 2B. Stub 78*a* includes slug 67 attached to stepping motor 79*a* by shaft 69. Motor 79*a* adjusts the insertion distance of slug 67 into waveguide portion 76*a* . Sliding contacts 92 and 94, shown greatly simplified in FIG. 2B, provide the shorting of slug 67 as is known by those skilled in the art. Preferably, switch 98 is included for establishing an absolute slug position. For example, before the device is used slug 67 could be fully inserted until switch contact 96 makes switch 98. The switch closed signal passes through line 99 to controller 86, FIG. 2A. Then, stepping motor 79*a* is controlled from controller 86 through line 97 to back stub 67 out of the waveguide as necessary to minimize the reflected power. By using a stepping motor, the absolute position of slug 67 may be determined because its starting point is known.

Controller 86, FIG. 2A, individually controls stubs 78, 80 and 82 to minimize reflected power; a reflected power in the range of 5% of the forward power is typical for the close impedance matching made possible by the present invention.

Figure 3:
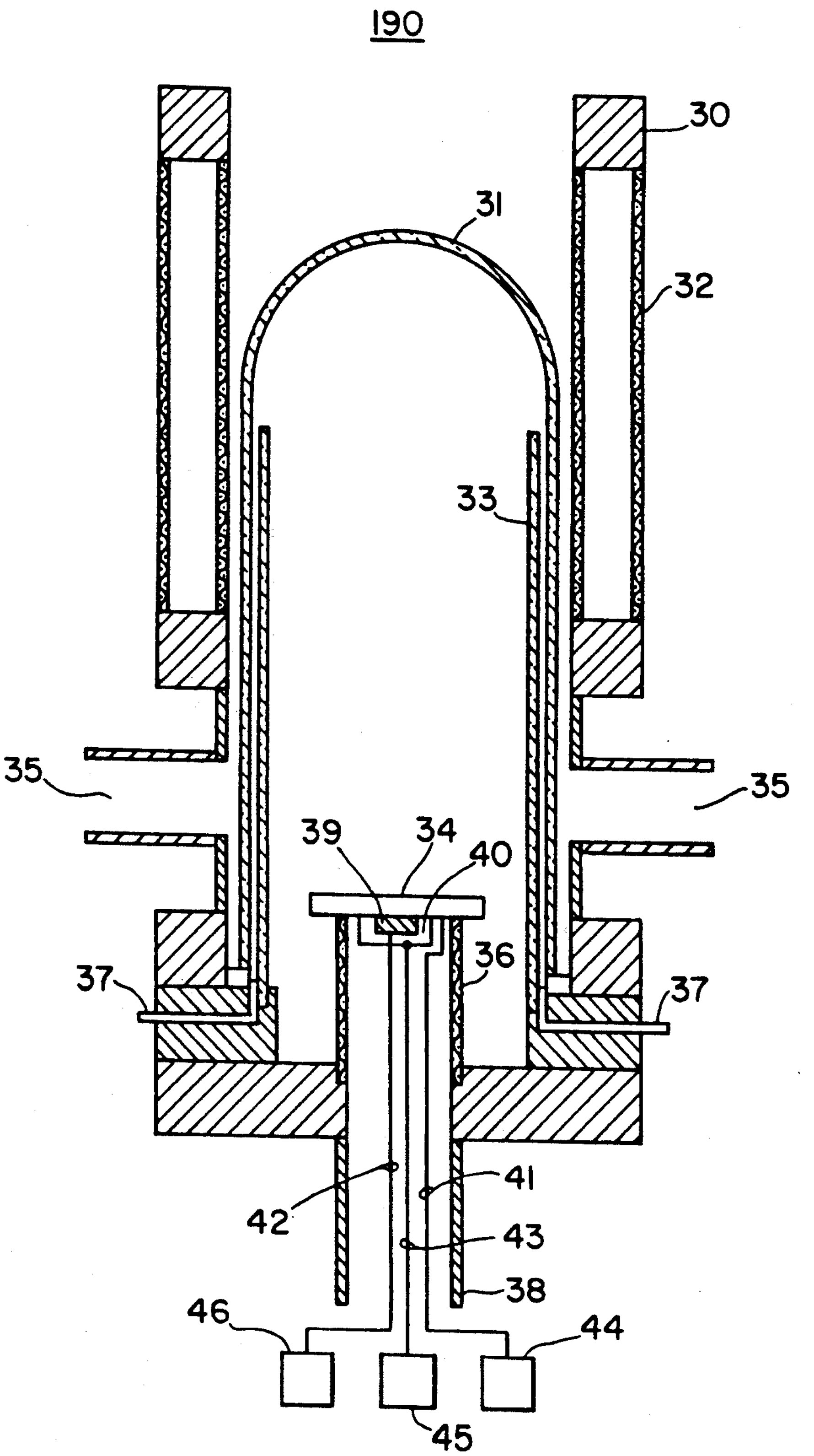
FIG. 3 is a cross-sectional, schematic diagram of the plasma production region of a microwave plasma generator according to this invention.

Unmagnetized plasma source 190 for use with the coupling device according to this invention is shown in FIG. 3. In this example, the material being energized, for example, a microprocessor chip, is held directly in the plasma source. Alternatively, the plasma could be used in a separate processing chamber as is apparent to those skilled in the art. Flange 30 is coupled to the output of the circular waveguide, for example, waveguide 29, FIG. 1A, for coupling the circular microwave field to the gas being energized. Quartz bell jar 31 is employed as a plasma vacuum chamber invisible to the microwave energy for containing the gas to be energized to form the plasma. The gas is circumferentially directed into bell jar 31 through opening 37 and directed up toward the top of bell jar 31 by annular quartz baffle 33. The circular microwave field energizes the gas to form plasma in bell jar 31. Single or double screen 32 is provided for viewing the interior of bell jar 31 and exhausting cooling air, while preventing microwave leakage. Cooling air is pumped through openings 35 for cooling the bell jar. Substrate 34 is located near the end of chamber 190, and may be heated by heater 39 supplied with power from power source 46 through wires 42. Substrate 34 may also be cooled by cooling block 40 supplied with water from water source 45 through pipes 43. This heating and cooling allows operation over a wide range of substrate temperatures. Substrate temperature is monitored by temperature indicator 44, which includes temperature probe 41. Perforated flange 36 allows evacuation of bell jar 31 through outlet pipe 38.

In use, the plasma is formed near the top of bell jar 31 and drawn down by the vacuum action to contact substrate 34. Alternatively, the plasma source may be employed as an ultraviolet light source. In that case, the far end of chamber 190 is preferably closed with a grid which creates a microwave cavity but allows the ultraviolet energy to pass therethrough. The ultraviolet energy may then be used in any manner desired, for example, for energizing a gas flowed over a substrate for reactive gas generation for substrate processing.

Figure 4:
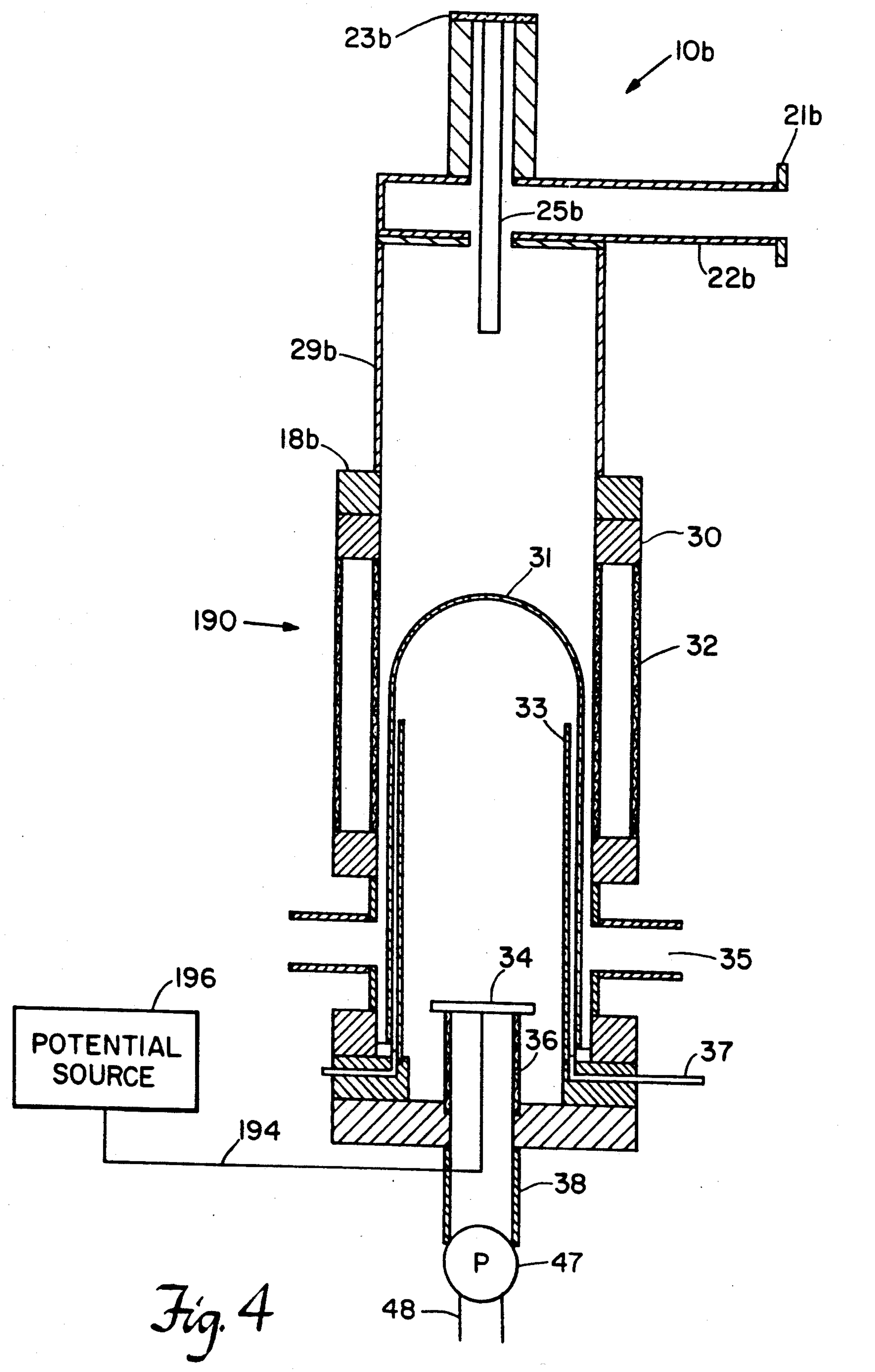
FIG. 4 is a cross-sectional, schematic diagram of a microwave coupling device and plasma production region of a microwave plasma generator according to this invention.

Plasma source 190 is shown coupled to microwave coupling device 10*b* in FIG. 4. Flange 18*b* mates with flange 30 for coupling the circular microwave field in output wave guide 29*b* to the plasma in chamber 31. Probe 25*b* generates the microwave field from the microwave source coupled to flange 21*b* and preferably passes centrally through waveguide 22*b* and coaxially into waveguide 29*b* for generating an axisymmetric circular microwave field in waveguide 29*b* for axisymmetrically energizing the plasma or other down-stream material being processed. Ultraviolet guard 23*b* allows external monitoring of the plasma through probe 25*b* but prevents ultraviolet energy from escaping.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A microwave coupling device for generating a microwave field in a circular waveguide for energizing a material, comprising:

a rectangular input waveguide for carrying microwave energy from a microwave source;

a circular output waveguide;

means for coupling said microwave energy from said input waveguide to said output waveguide for generating in said output waveguide said microwave field; and an annular tube coupled to an opening in said input waveguide for permitting external monitoring of the inside of said output waveguide.

2. The coupling device of claim 1 in which said means for coupling includes a probe passing through said input waveguide and into said output waveguide.

3. The coupling device of claim 2 in which said probe is coaxial with said output waveguide for producing an axisymmetric microwave field.

4. The coupling device of claim 3 in which said probe is cylindrical.

5. The coupling device of claim 3 in which said probe is tubular.

6. The coupling device of claim 5 in which said probe is open at both ends to provide said tube for permitting external monitoring.

7. The coupling device of claim 2 in which said means for coupling further includes a solid plate transverse to said probe for separating said input waveguide from said output waveguide.

8. The coupling device of claim 7 in which said means for coupling further includes an enlarged opening in said plate coaxial with said probe for creating an open passage between said input waveguide and said output waveguide for supporting a radial electric field for launching said microwave field in said output waveguide.

9. The coupling device of claim 8 in which said passage is annular for uniformly launching said microwave field for producing an axisymmetric field in said output waveguide to axisymmetrically energize the material.

10. The coupling device of claim 9 in which said probe has a diameter of approximately one inch.

11. The coupling device of claim 10 in which said enlarged opening has a diameter of approximately 1.5 inches for creating an annular passage approximately 0.25 inches wide.

12. The coupling device of claim 1 further including means, integral with said input waveguide, for tuning said microwave field to substantially match the load impedance.

13. The coupling device of claim 12 in which said means for tuning includes a multistub tuner having a plurality of tuning stubs individually insertable into said input waveguide.

14. The coupling device of claim 13 in which said means for tuning further includes means for controlling the insertion of said stubs into said input waveguide.

15. The coupling device of claim 14 in which said means for controlling includes means for indicating the depth of insertion of said stubs in said input waveguide.

16. The coupling device of claim 14 in which said means for controlling includes motor means for separately controlling the amount of stub insertion in said input waveguide.

17. The coupling device of claim 14 further including means, integral with said input waveguide, for detecting the amount of reflected microwave power in said input waveguide flowing toward the microwave source.

18. The coupling device of claim 17 in which said means for controlling is responsive to said means for detecting for inserting said stubs in said input waveguide to minimize the reflected power.

19. The coupling device of claim 13 in which said stub tuner includes at least three tuning stubs for matching the real and reactive load impedance.

20. A microwave source for generating a circular axisymmetric microwave field for axisymmetrically energizing a material, comprising:

a rectangular input waveguide;

means for introducing a microwave source into said input waveguide;

a circular output waveguide;

means for connecting said input waveguide to said output waveguide;

a rod assembly passing through said input waveguide coaxially into said output waveguide and ending in said output waveguide for generating in said output waveguide from said microwave source said circular axisymmetric microwave field; and tuning means in said input waveguide for altering said microwave field to substantially match the load impedance for efficiently coupling the microwave energy to said material.

21. The microwave source of claim 20 in which said tuning means includes a three stub tuner for substantially matching the real and reactive load impedance.

22. A microwave plasma generator, comprising:

a waveguide apparatus including a rectangular input waveguide coupled to a circular output waveguide;

means for introducing a microwave source into said input waveguide;

a probe assembly passing through said input waveguide into said output waveguide and ending in said output waveguide for generating form said source in said output waveguide a microwave field;

means in said waveguide apparatus for tuning said field to substantially match the load impedance;

a vacuum chamber for containing a gas to be energized to form said plasma;

means for introducing said gas into said vacuum chamber; and means for coupling said field to said gas for energizing said gas to form said plasma.

23. The microwave plasma generator of claim 22 in which said means for tuning includes a multistub tuner integral with said waveguide apparatus for substantially matching the real and reactive load impedance.

24. The microwave plasma generator of claim 22 in which said probe assembly includes a tubular probe passing through said input waveguide and coaxially into said output waveguide.

25. The microwave plasma generator of claim 24 in which said probe is visually accessible at both ends to allow external monitoring through said probe of said plasma.

26. The microwave plasma generator of claim 25 in which one end of said probe is covered with an ultraviolet shield to prevent ultraviolet radiation from escaping from said waveguide apparatus through said probe.

27. The microwave plasma generator of claim 25 in which said probe has a diameter of less than one-half of the wavelength of said microwave field to prevent said field from escaping from said waveguide apparatus through said probe.

28. The microwave plasma generator of claim 24 in which said probe is cylindrical.

29. The microwave plasma generator of claim 24 in which said probe is inserted into said output waveguide a distance of approximately an integral multiple of one-quarter of the wavelength of said microwave field for at least partially matching the plasma impedance.

* * * * *